May 19, 1925.
F. J. LAIRD
VALVE
Filed Nov. 1, 1924
1,538,404
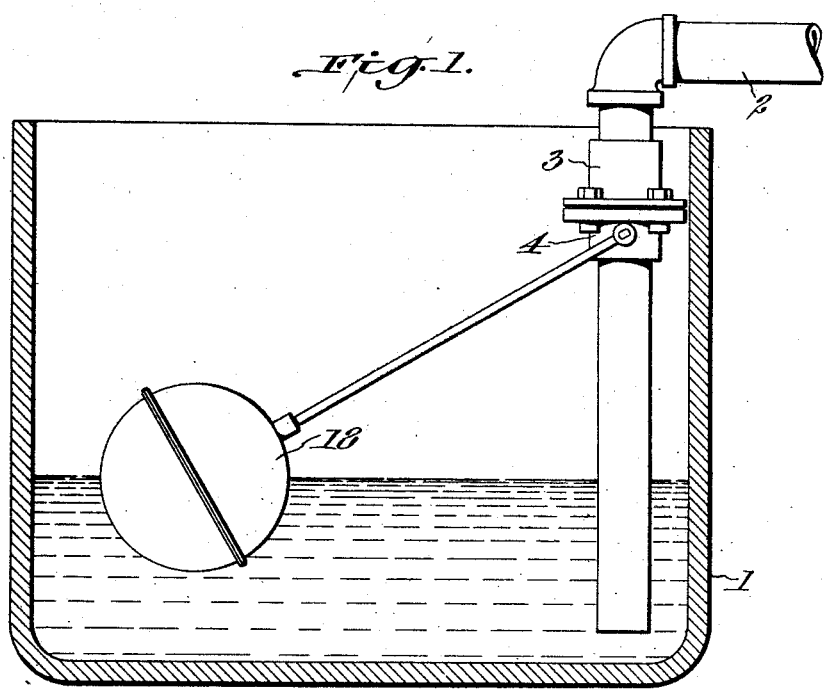
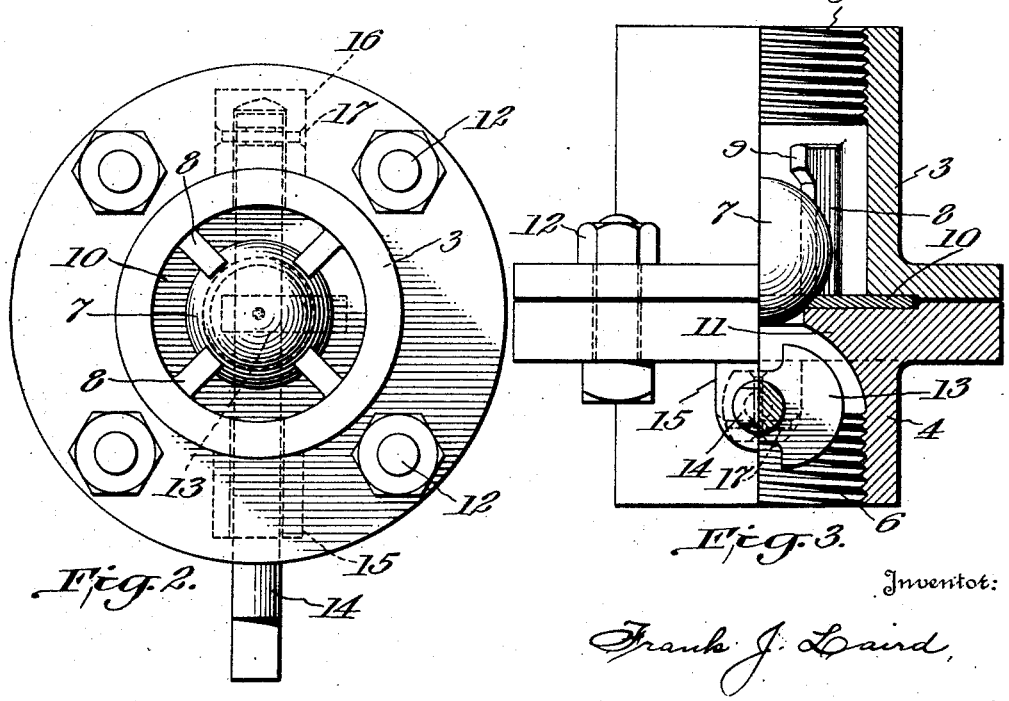
Inventor:
Frank J. Laird,
By Byrnes Townsend & Buckenstein
Attorneys.

Patented May 19, 1925.

1,538,404

UNITED STATES PATENT OFFICE.

FRANK J. LAIRD, OF BUTTE, MONTANA.

VALVE.

Application filed November 1, 1924. Serial No. 747,257.

*To all whom it may concern:*

Be it known that I, FRANK J. LAIRD, a citizen of United States, residing at Butte, in the county of Silverbow and State of Montana, have invented certain new and useful Improvements in Valves, of which the following is a specification.

This invention relates to a valve and particularly to a ball valve adapted to be employed as a tank float valve or in other places where it is desirable to introduce a mechanically operated valve in a pipe line.

An object of the invention is to provide a simple and efficient valve of the tank float valve type which may be manufactured cheaply. A further object is to provide a valve of the type stated which may be readily inserted in a pipe line in place of the usual pipe coupling.

More specifically, an object is to provide a valve having a valve seat which may be easily cleaned or replaced.

These and other objects of my invention will be apparent from the accompanying specification when taken in connection with the accompanying drawings, in which—

Fig. 1 is an elevation, partly in vertical section, showing the invention embodied in a tank float valve.

Fig. 2 is a plan view of the valve, and

Fig. 3 is a side elevation, partly in vertical section, of the valve.

In the drawings, the numeral 1 indicates a tank which is supplied with water or other fluid through a pipe 2, the flow being controlled by a float operated valve embodying my invention.

The valve casing comprises a pair of flanged cylinders or pipe sections 3, 4 which are provided with means, such as screw threaded portions 5, 6, respectively, for attaching the same to a pipe line. The spherical metal ball 7 is movable within the cage formed by ribs 8 on the cylinder 3, the ribs terminating in flanges 9 which overhang the ball valve 7. The ball valve 7 cooperates with a seat 10 which is removably mounted in alined recesses at the meeting faces of the flanged portions of the cylinders. The valve seat is preferably formed from a standard thickness of thin metal stock, and the seat is shaped to the same redius as that of the ball 7. The valve seat 10 is supported by the inturned flange 11 of the cylinder 4, which flange extends substantially to the inner edge of the valve seat. The seat 10 is readily accessible for cleaning or renewal upon removal of the fastening means 12, which hold the flanges together.

The ball 7 may be forced from its seat by a cam 13 on a shaft 14 which is carried in bosses 15, 16 on the cylinder 4. The shaft 14 is locked in place by a pin 17 which passes through the boss 16 and lies within a circumferential groove in the cam shaft. The opposite end of the shaft 14 may be squared or otherwise shaped to receive an operating means such as the float 18.

It will be noted that the valve may be inserted in a pipe line in place of one of the usual couplings and that the cam shaft is located at the low presure side of the valve. When used as a tank float valve, no packing is necessary and when used in pipe lines having a material pressure at the outlet side of the valve, a minimum of packing is required since the shaft need be packed only at the boss or bearing 15. The valve casing may be quickly opened to inspect or replace the valve plate 10.

It is to be understood that the invention is not limited to the specific embodiment herein described since many changes which may be made in the several parts, their relative size, shape and location, fall within the scope of my invention as set forth in the following claims.

I claim:—

1. A valve comprising a pair of flanged pipe sections, each of said sections having a threaded portion spaced from the flanged end thereof, a ball in one of said sections, a cage integral with said section and limiting the range of movement of said ball, a metal plate between the flanged ends of said pipe sections and having a valve seat formed therein, a pair of bosses on the other of said pipe sections, a shaft mounted in said bosses, and a cam on said shaft and operable to force said ball from said valve seat.

2. In a valve, a valve casing comprising a pair of flanged cylinders having means at their unflanged ends for attachment to pipe sections, a thin metal plate between the flanged ends of said cylinders and having a valve seat formed therein, a ball valve in one of said cylinders, ribs integral with the said cylinder and defining a cage for said valve, a shaft carried by the second of said cylinders and a cam on said shaft operable to force said ball from said seat, said second cylinder having a flange supporting said valve seat and extending substantially to the inner edge thereof.

3. In a valve, a cylinder having an inwardly and an outwardly directed flange, a metal plate on said inturned flange and having a valve seat formed therein, a second cylinder having an outwardly directed flange for clamping said plate to said first cylinder, a ball valve in the second clinder, and a cam carried by the first cylinder for forcing said valve from said seat.

In testmony whereof, I affix my signature.

FRANK J. LAIRD.